US008065688B2

(12) United States Patent
Melloul et al.

(10) Patent No.: US 8,065,688 B2
(45) Date of Patent: Nov. 22, 2011

(54) TRANSPARENTLY CAPTURING THE CAUSAL RELATIONSHIPS BETWEEN REQUESTS ACROSS DISTRIBUTED APPLICATIONS

(75) Inventors: Laurence Melloul, Seattle, WA (US); Alexander T. Weinert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

(21) Appl. No.: 11/626,144

(22) Filed: Jan. 23, 2007

(65) Prior Publication Data

US 2008/0178195 A1   Jul. 24, 2008

(51) Int. Cl.
 G06F 3/00 (2006.01)
 G06F 9/44 (2006.01)
 G06F 13/00 (2006.01)
(52) U.S. Cl. ....................................................... 719/320
(58) Field of Classification Search ................... 719/320
 See application file for complete search history.

(56) References Cited

U.S. PATENT DOCUMENTS

| | | | |
|---|---|---|---|
| 5,822,586 A | 10/1998 | Strutt et al. | |
| 6,066,181 A | 5/2000 | DeMaster | |
| 6,289,375 B1 | 9/2001 | Knight et al. | |
| 6,298,478 B1 | 10/2001 | Nally et al. | |
| 6,643,638 B1 | 11/2003 | Xu | |
| 6,751,798 B1 | 6/2004 | Schofield | |
| 7,051,341 B2 | 5/2006 | Burton et al. | |
| 7,103,600 B2 | 9/2006 | Mullins | |
| 2002/0174415 A1* | 11/2002 | Hines | 717/127 |
| 2004/0010570 A1* | 1/2004 | Kaler et al. | 709/220 |
| 2004/0210877 A1* | 10/2004 | Sluiman et al. | 717/130 |
| 2005/0144624 A1 | 6/2005 | Riosa et al. | |
| 2006/0037032 A1 | 2/2006 | Synovic et al. | |
| 2006/0164997 A1 | 7/2006 | Graepel et al. | |
| 2006/0235838 A1 | 10/2006 | Shan et al. | |

FOREIGN PATENT DOCUMENTS

WO   WO0186395   11/2001

OTHER PUBLICATIONS

Chen, Xuejun, "Dependence Management for Dynamic Reconfiguration of Component-Based Distributed Systems", Proceedings of the 17th IEEE International Conference on Automated Software Engineering (ASE'02), 2002 IEEE, 6 pages.
Chang, Chialin, et al., "Support for Distributed Dynamic Data Structures in C++", Computer Science Technical Report Series, 1995, pp. 1-13.
Cooper, Eric C., "Replicated Procedure Call", 1984 ACM, pp. 44-56.
Aguilera, Marcos K., et al., "Performance Debugging for Distributed Systems of Black Boxes", SOSP '03, Oct. 19-22, 2003, 16 pages.
Dunagan, John, et al., "FUSE: Lightweight Guaranteed Distributed Failure Notification", Operating Systems Design and Implementation, 2004.

* cited by examiner

*Primary Examiner* — Andy Ho
*Assistant Examiner* — Timothy A Mudrick
(74) *Attorney, Agent, or Firm* — Workman Nydegger

(57) ABSTRACT

Several embodiments disclosed herein are directed to methods, computer program products, and systems configured to track operation dependencies. For example, in one embodiment, at a first entity, a first identifier corresponding to a first operation is accessed. For a second operation occurring as a result of the first operation, a second identifier is generated. A directed event including the first and second identifiers is emitted. The directed event is logged. The second identifier is sent to a second entity. An operation call for the second operation is also sent to the second entity. The second identifier is made available at the second entity for use in creating directed events for subsequent operations occurring as a result of the second operation.

20 Claims, 3 Drawing Sheets

TRANSPARENTLY CAPTURING THE CAUSAL RELATIONSHIPS BETWEEN REQUESTS ACROSS DISTRIBUTED APPLICATIONS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Often, various computer systems and business applications may be mixed in an enterprise environment. Separate and distinct applications may interact with one another by sending operation calls to each other, receiving data from one another, and otherwise interacting with one another. Even when a system has been designed for a particular enterprise, company mergers and acquisitions may result in a heterogeneous system including a number of different systems and applications.

Within a computing system, there is often a need to track the system usage for troubleshooting or for other purposes. For example, a network administrator may wish to understand how events emitted by one application correlate to events and operations performed at another application or system.

Previous systems have allowed events for operations to be grouped together, but have not maintained information about causality relationships between operations in an application generic way. The previous systems resulted in a loss of causality information as well as often a loss of any association whatsoever between operations.

The subject matter claimed herein is not limited to embodiments that solve any disadvantages or that operate only in environments such as those described above. Rather, this background is only provided to illustrate one example of a technology area where some embodiments described herein may be practiced.

BRIEF SUMMARY

Several embodiments disclosed herein are directed to methods, computer program products, and systems configured to track operation dependencies. For example, in one embodiment, at a first entity, a first identifier corresponding to a first operation is accessed. For a second operation occurring as a result of the first operation, a second identifier is generated. A directed event including the first and second identifiers is emitted. The directed event is logged. The second identifier is sent to a second entity. An operation call for the second operation is also sent to the second entity. The second identifier is made available at the second entity for use in creating directed events for subsequent operations occurring as a result of the second operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments may include a special purpose or general-purpose computer including various computer hardware, as discussed in greater detail below.

In one embodiment, the causal relationships between operations are maintained by generating and tracking directed events using identifiers for the operations. Illustratively, a first operation has associated with it a first identifier. For subsequent operations that result because of the first operation, subsequent identifiers will be generated. A directed event which includes the first identifier and a subsequent identifier for a subsequent operation can be logged. A call to the subsequent operation along with the subsequent identifier for the subsequent operation can be sent to a second entity. The subsequent identifier for the subsequent operation is made publicly available such that directed events even further subsequent to the subsequent operation can be emitted and logged as well. The process described above can be repeated such that causal relationships are maintained. In one embodiment, this allows for the construction of a tree data structure to represent the causal relationships between operations.

Figure 1:
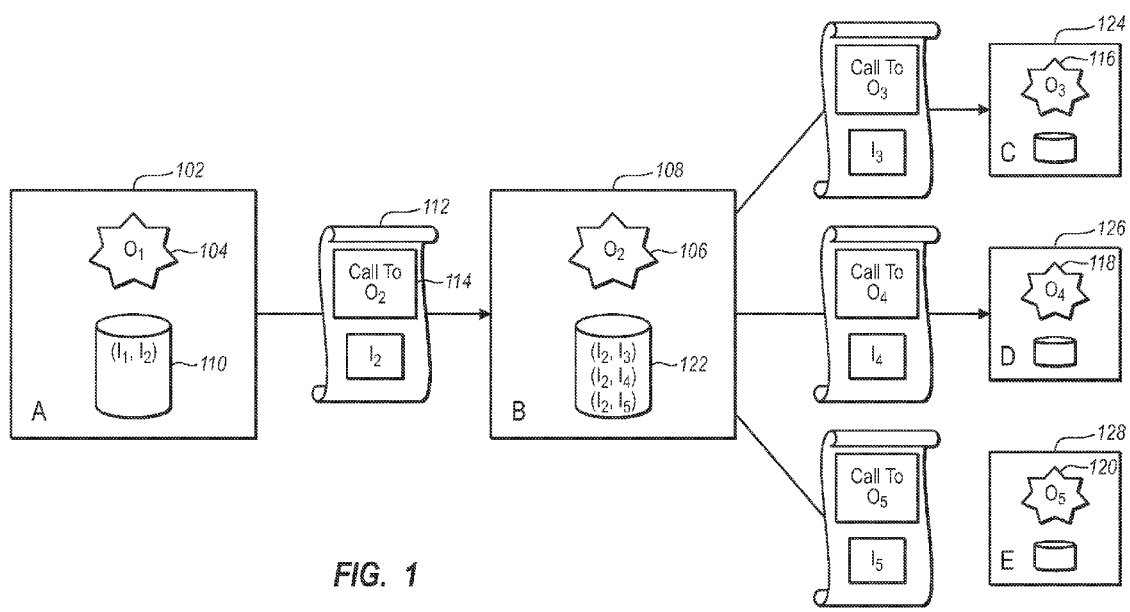
FIG. 1 illustrates an environment including a number of entities where operations are performed at the entities.

Referring now to FIG. 1, a more concrete example is illustrated. FIG. 1 illustrates an entity A 102. Entity A 102 may be any one of a number of physical or logical constructs including a standalone computer system, an application, or any other suitable structure. At entity A, a first operation 104 is performed. As a result of the first operation 104, a second operation 106 should be performed at entity B 108.

Associated with the first operation 104 is an identifier $I_1$. At entity A 102, an identifier $I_2$ is generated and corresponds to the second operation 106. A directed event may be emitted where the directed event includes information identifying the relationship between the second operation 106 and the first operation 104.

FIG. 1 illustrates a database 110 where the directed event ($I_1$, $I_2$) is stored. Notably, while a database 110 is illustrated here, various other data structures or storage structures may be implemented to store directed events. For example, in one embodiment, a flat file including XML elements may be used to store directed events.

Entity A 102 may send a message 112 to entity B 108. The message 112 includes a call 114 to the second operation 106 and the second identifier $I_2$ generated for the second operation 106. While in this example, a message is shown with both the call to the second operation 106 and the second identifier $I_2$, various alternative methods may also be used for sending the call and identifier. For example, each can be sent separately in separate messages. Different protocols, channels, and other means may be used to send calls and identifiers. Various methods may be used to correlate the call and the identifier.

At entity B 108, the second identifier $I_2$ is made available for further subsequent operations. Specifically, the second identifier $I_2$ can be used in creating directed events for operations that occur as a result of the second operation 106. The second identifier $I_2$, or more generally a propagated operation identifier, can be set in a local scope at a callee where the operation is executed, in this example at entity B 108. This facilitates capturing all subsequent operation calls and facilitates the correlation of subsequent operation calls to their parent call.

To facilitate the capturing and correlation of relationship information for all subsequent operations and to ensure that only relationship information for subsequent operations descendent from an operation are correlated as relating to the originating operation, appropriate scope for operation identifiers is maintained. For example, a received operation identifier may be made available in thread-local-storage when any processing for the operation occurs. As such, all events, including events for tracking new nested calls for operations dependent from a preceding operation, emitted from the particular scope can be listed as related to the preceding operation by the operation identifier for the preceding operation. In one embodiment, threads that are related to an operation execution are tracked such that descendent operations executed in different threads over time may be appropriately correlated as relating to a preceding operation. This is performed for example, when an operation spawns multiple threads. Notably, this functionality may also be useful when the same thread spans multiple operations over time.

Returning once again to FIG. 1, FIG. 1 illustrates that a third operation 116, a fourth operation 118, and a fifth operation 120 should occur as a result of the second operation 106. Various acts may be performed recursively to track further dependencies. At entity B, an identifier $I_3$ for the third operation 116, an identifier $I_4$ for the fourth operation 118, and an identifier $I_5$ for the fifth operation 120 are generated. At entity B, directed events ($I_2$, $I_3$), ($I_2$, $I_4$), ($I_2$, $I_5$) are emitted and stored as shown at 122 to record the causal relationships between operation 2 106 and operation 3 116, operation 2 106 and operation 4 118 and operation 2 106 and operation 5 120.

FIG. 1 further illustrates that entity B sends the identifiers; $I_3$ for operation 3 116, $I_4$ for operation 4 118 and $I_5$ for operation 5 120; to subsequent entities, entity C 124, entity D 126, and entity E 128 respectively where the respective operations will be performed. At the subsequent entities, the sent identifier can be used to emit and store even further subsequent directed events for further subsequent operations.

Figure 2:
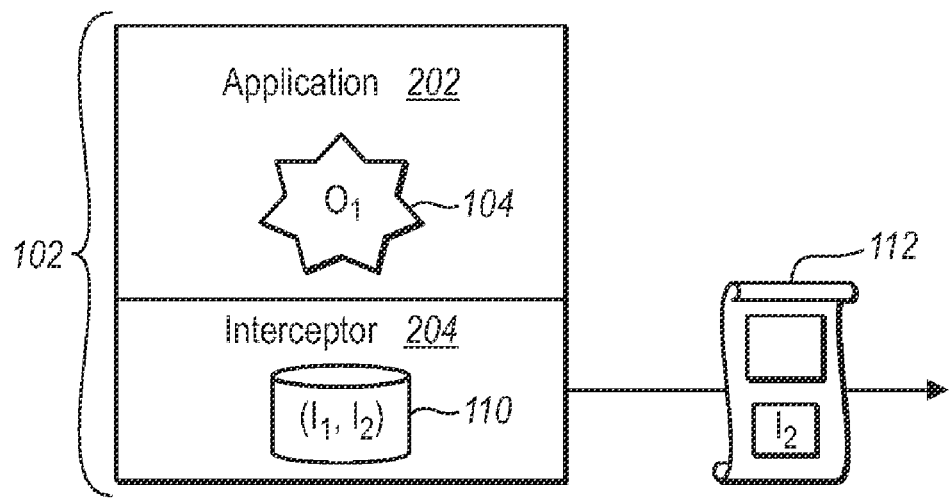
FIG. 2 illustrates an entity including an interceptor.

Referring now to FIG. 2, various features that may be implemented in some embodiments are illustrated. FIG. 2 illustrates that the entity 102 includes an application portion 202 and an interceptor portion 204. By using the interceptor 204, the application code 202 does not need to be modified to implement the event generation and logging described previously, Rather, the interceptor 204 can be used to intercept requests at entry and/or exit points. The interceptor 204 can generate directed events, such as ($I_1$, $I_2$), log the events in the database 110 or other storage, modify the message 112 to add the identifier $I_2$, etc. At an entity that receives the modified message 112, an interceptor 102 can read the message 112, make the identifier available for subsequent operations, and perform other tasks.

In one embodiment, the interceptor 102 may be part of a framework. In this embodiment, operation calls and other messages may be mapped to message exchanges. Before being transmitted "on the wire" the messages may pass through a number of processing steps in a communication stack. For example, appropriate security or reliable messaging headers can be added to a message. In one embodiment, processing steps implemented in a communication stack may further generate identifiers for operations and emit directed events including the causal relationships previously discussed.

Figure 3:
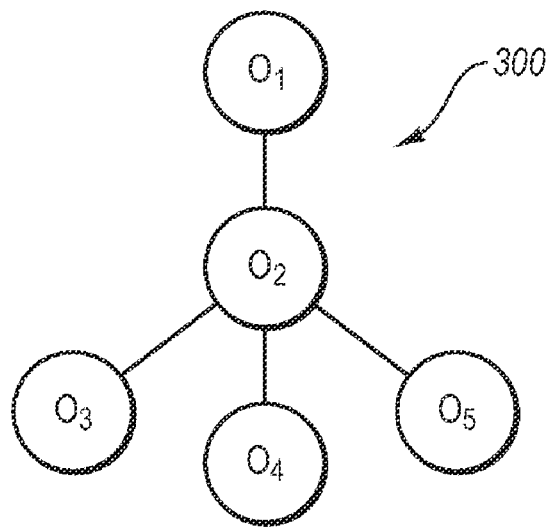
FIG. 3 illustrates a pictorial view of a hierarchical graph.

Referring now to FIG. 3, a hierarchical graph 300 is illustrated. The hierarchical graph 300 illustrates operation dependencies. The particular hierarchical graph 300 illustrated in FIG. 3 is pictorial illustration of a graph that can be constructed for the operation dependencies shown in FIG. 1. The graph, including dependency information, may be generated by assembling a list of directed events. In the example illustrated in FIGS. 1 and 3, the collection of the directed events including ($I_1$, $I_2$), ($I_2$, $I_3$), ($I_2$, $I_4$), and ($I_2$, $I_5$) is sufficient to construct the graph 300 illustrated pictorially.

Figure 4:
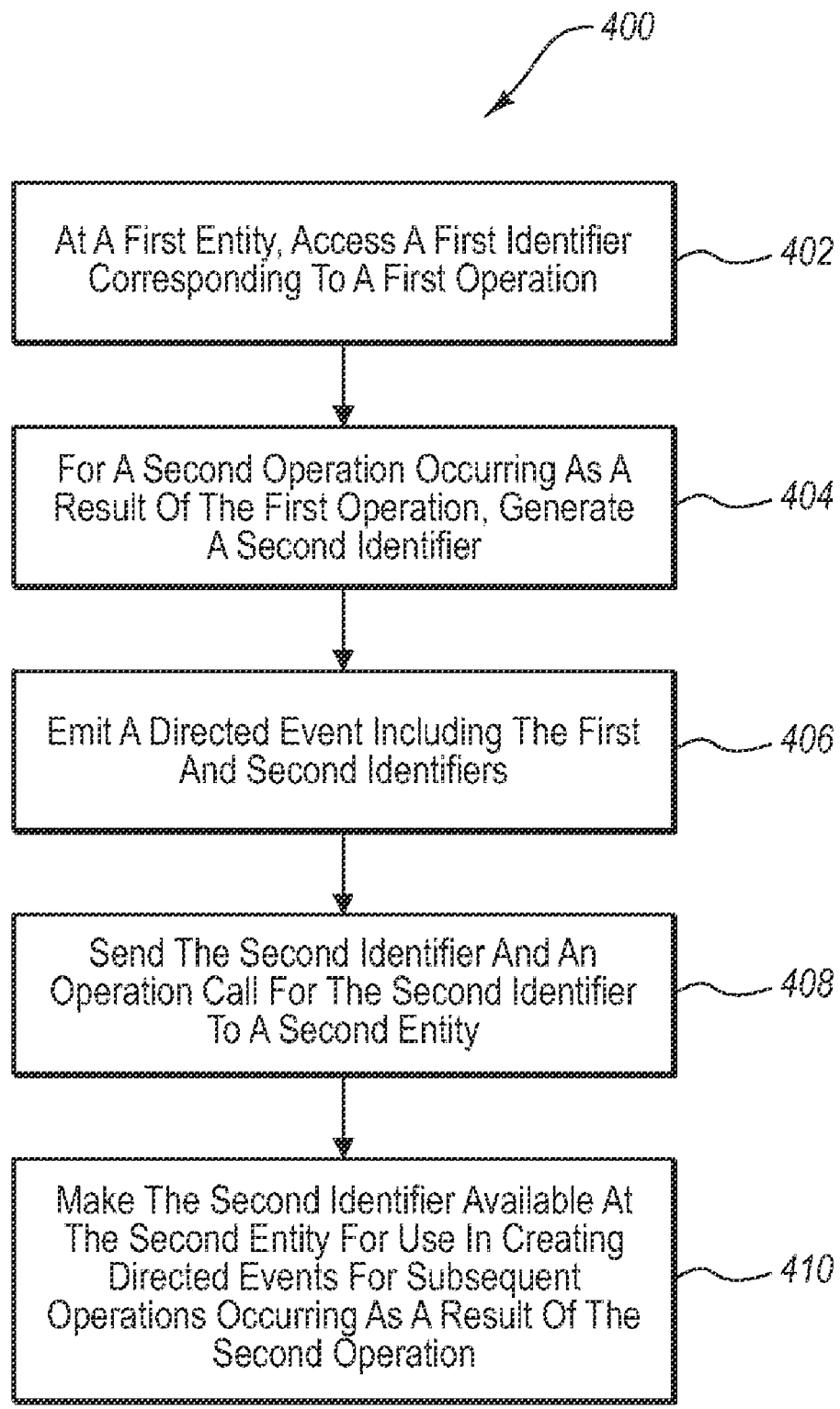
FIG. 4 illustrates a method of tracking operation relationships.

Embodiments may be described in terms of methods comprising various acts. The following is a description of acts that may be performed. Although the acts may be described or claimed in a particular order, the present invention is not necessarily limited to any particular ordering or combination of acts. Referring now to FIG. 4, a method 400 is illustrated. The method 400 includes acts usable in a computing environment to perform a method of tracking operation dependencies.

The method includes at a first entity, accessing a first identifier corresponding to a first operation (act 402). For example, FIG. 1 illustrates the identifier $I_1$ corresponding to the operation $O_1$. An identifier like $I_1$ may be accessed. In one embodiment, the first identifier may be made available at the first entity for creating directed events for subsequent operations occurring as a result of the first operation. For example, the identifier may be available generally in an appropriate scope such as in a thread local storage or other scope such that the identifier may be used for directed event emission.

For a second operation occurring as a result of the first operation, the method 400 includes generating a second identifier (act 404). As an example and as illustrated in FIG. 1, $I_2$ is generated for the operation $O_2$ 106.

The method 400 further includes emitting a directed event including the first and second identifiers (act 406). FIG. 1 illustrates an example of this behavior where the directed event ($I_1$, $I_2$) has been emitted and logged in the database 110. In one example embodiment, emitting a directed event including the first and second identifiers is performed by a generic interceptor at an entry or exit point of an application. For example, FIG. 2 illustrates an interceptor 204 which may emit and log directed events. This may allow the functionality described to be implemented in a framework using unmodified application code for applications running in the framework. Notably, the directed events generated may be infrastructure level events or application level events.

The method 400 further includes sending the second identifier and an operation call for the second identifier to a second entity. In FIG. 1, one example of this is illustrated where the message 112 includes the second identifier $I_2$, and an operation call to $O_2$ 114. The message 112 is sent to a second entity such as entity B 108. Notably, as explained previously, identifiers may be sent together in a message with the operation call for the second operation. Alternatively, the identifiers may be sent in a message separate from the operation call and may use the same or different channels, protocols, etc.

The method 400 further includes making the second identifier available at the second entity for use in creating directed events for subsequent operations occurring as a result of the second operation. As illustrated in one example shown in FIG. 1, the identifier $I_2$ may be available for creating the directed events $(I_2, I_3)$, $(I_2, I_4)$, and $(I_2, I_5)$ illustrated in FIG. 1.

In one embodiment, and as described previously, making the second identifier available may include making the second identifier available in thread-local-storage.

As described previously herein, portions of embodiments of the method 400 may be performed using application code for performing the first, second, and any subsequent operations in a framework. The application code used to execute the operations may be unmodified with respect to generating and logging directed events. As such the application code is agnostic to the directed events.

The method 400 may further include creating a hierarchical map of events, such as the map represented in the pictorial illustration illustrated in FIG. 3. Specifically, in one embodiment, the directed events may be assembled such that a representation of hierarchical relationships can be maintained as a hierarchical map. In one embodiment, this may be accomplished by storing the directed events or information in the directed events in a hierarchical data structure such as an XML data structure.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of tracking operation dependencies, the method comprising acts of:
   at a first entity comprised of a physical computer system, accessing a first identifier corresponding to a first operation;
   at the first entity, for a second operation that should occur, but which has not yet occurred, as a result of the first operation causing a call for the second operation to be made to a second entity, generating a second identifier prior to sending an operation call to the second entity for the second operation;
   emitting a directed event including the first and second identifiers;
   logging the directed event, including logging the first identifier for the first operation together with the second identifier of the second operation, where the second operation occurs as a result of the first operation making a call for the second operation at the second entity;
   sending the second identifier corresponding to the second operation to the second entity;
   sending an operation call for the second operation to the second entity, where the second operation is performed at the second entity;
   making the second identifier available at the second entity for use in creating directed events for subsequent operations occurring as a result of the second operation, wherein each directed event resulting from subsequent calls to subsequent operations by the second operation includes the second identifier together with an identifier for a subsequent operation;
   assembling a list of directed events; and
   constructing a dependency graph of operational dependencies based on the directed events.

2. The method of claim 1, wherein the first identifier is made available at the first entity for creating directed events for subsequent operations occurring as a result of the first operation.

3. The method of claim 1, wherein the method is performed using application code for performing the operations in a framework where the application code is unmodified with respect to generating directed events, such that the application code is agnostic to the directed events.

4. The method of claim 1, wherein the second identifier is sent in a message with the operation call for the second operation.

5. The method of claim 1, wherein emitting a directed event including the first and second identifiers is performed by a generic interceptor at an entry or exit point of an application.

6. The method of claim 1, wherein the directed event is an infrastructure level event.

7. The method of claim 1, wherein the directed event is an application level event.

8. The method of claim 1, further comprising creating a hierarchical map of events.

9. The method of claim 1, wherein making the second identifier available comprises making the second identifier available in thread-local-storage.

10. The method of claim 1, further comprising for operations, identifiers, and entities subsequent to the first and second operations, identifiers, and entities, recursively performing acts of accessing, generating, emitting, logging, sending, and making available to track subsequent operation dependencies.

11. A computer readable storage medium comprising computer executable instructions that when executed by one or more processors cause the one or more processors to perform the following acts:
  at a first entity, accessing a first identifier corresponding to a first operation;
  at the first entity, for a second operation that should occur, but which has not yet occurred, as a result of the first operation causing a call for the second operation to be made to a second entity, generating a second identifier;
  emitting a directed event including the first and second identifiers;
  logging the directed event, including logging the first identifier for the first operation together with the second identifier of the second operation, where the second operation occurs as a result of the first operation making a call for the second operation at the second entity;
  sending the second identifier corresponding to the second operation to the second entity;
  sending an operation call for the second operation to the second entity, where the second operation is performed at the second entity;
  making the second identifier available at the second entity for use in creating directed events for subsequent operations occurring as a result of the second operation, wherein each directed event resulting from subsequent calls to subsequent operations by the second operation includes the second identifier together with an identifier for a subsequent operation;
  assembling a list of directed events; and
  constructing a dependency graph of operational dependencies based on the directed events.

12. The computer readable medium of claim 11, wherein the first identifier is made available at the first entity for creating directed events for subsequent operations occurring as a result of the first operation.

13. The computer readable medium of claim 11, wherein the acts are performed using application code for performing the operations in a framework where the application code is unmodified with respect to generating directed events, such that the application code is agnostic to the directed events.

14. The computer readable medium of claim 11, wherein the second identifier is sent in a message with the operation call for the second operation.

15. The computer readable medium of claim 11, wherein emitting a directed event including the first and second identifiers is performed by a generic interceptor at an entry or exit point of an application.

16. The computer readable medium of claim 11, wherein the directed event is an infrastructure level event.

17. The computer readable medium of claim 11, wherein the directed event is an application level event.

18. The computer readable medium of claim 11, further comprising instructions for creating a hierarchical map of events.

19. The computer readable medium of claim 11, wherein making the second identifier available comprises making the second identifier available in thread-local-storage.

20. A computing system configured to track operation dependencies, the computer system comprising:
  a processor;
  a computer memory operably coupled to the processor wherein the computer memory comprises computer executable instructions that when executed by the processor cause the processor to perform the following acts:
    at a first entity, accessing a first identifier corresponding to a first operation;
    at the first entity for a second operation that should occur, but which has not yet occurred, as a result of the first operation causing a call for the second operation to be made to a second entity, generating a second identifier prior to sending an operation call to the second entity for the second operation;
    emitting a directed event including the first and second identifiers;
    logging the directed event, including logging the first identifier for the first operation together with the second identifier of the second operation, where the second operation occurs as a result of the first operation making a call for the second operation at the second entity;
    sending the second identifier corresponding to the second operation to the second entity;
    sending an operation call for the second operation to the second entity, where the second operation is performed at the second entity;
    making the second identifier available at the second entity for use in creating directed events for subsequent operations occurring as a result of the second operation, wherein each directed event resulting from subsequent calls to subsequent operations by the second operation includes the second identifier together with an identifier for a subsequent operation;
    assembling a list of directed events; and
    constructing a dependency graph of operational dependencies based on the directed events.

* * * * *